UNITED STATES PATENT OFFICE.

WILLIAM L. ROWLAND, OF PHILADELPHIA, PENNSYLVANIA.

PROCESS OF RECOVERING CYANIDES FROM COAL-GAS.

SPECIFICATION forming part of Letters Patent No. 465,600, dated December 22, 1891.

Application filed February 2, 1891. Serial No. 379,908. (No specimens.)

*To all whom it may concern:*

Be it known that I, WILLIAM L. ROWLAND, a citizen of the United States, and a resident of the city and county of Philadelphia, and State of Pennsylvania, have invented a new and useful Process for Recovering Cyanides from Coal-Gas, of which the following is a specification.

The object of my invention is to remove the cyanides from coal-gas in the ammoniacal liquor and recover them therefrom as completely and economically as possible. To this end I add to the water to be put into the washers, scubbers, or other form of apparatus used for extracting the ammonia from coal-gas any soluble salt of iron, as sulphate of iron, chloride of iron, &c., in sufficient quantity to convert all the cyanides in the crude gas into ferro-cyanides while passing through the ammonia-scrubber in the usual manner for the removal of ammonia. By this means all the cyanides can be converted into ferro-cyanide of ammonia and removed in solution in the ammoniacal liquor in one and the same operation generally employed for the removal of ammonia. The iron salt is at first changed in the scrubber into insoluble carbonate, sulphide, or hydrate of iron, but it is washed along with the water through the scrubber and gradually changed into the soluble ferro-cyanide of ammonia, thus removing the cyanides from the gas. This formation of sulphide of iron is but an incidental step in the process, as it is gradually and completely changed by contact with the cyanides in the gas into ferro-cyanide of ammonia if only the proper quantity of iron salt is used. This quantity varies according to the amount of cyanide found by analysis to be present in the gas, but is usually less than five per cent. of that necessary to remove the sulphides. As small an excess as possible in practice over the amount theoretically required should be employed, as any considerable excess will form enough sulphide of iron to clog or impede the action of the ammonia-scrubber. The solution of such a small amount of iron salt in the large amount of water necessary to remove all the ammonia from the gas produces a very weak solution, usually containing not over one-half per cent., by weight, of the salt. Owing to the long and intimate contact with the gas in the ammonia scrubber or washer, that apparatus is especially adapted for the removal of cyanides by this process, and I aim to accomplish this economically without interfering with the removal or subsequent recovery of the ammonia. Insoluble iron salts, as the oxide, can also be used by keeping them in suspension in the water by mechanical agitation, but the soluble salt is preferable, as it requires no agitation after being once dissolved, and the combined acid also assists in the removal of the last traces of ammonia from the gas. The addition of the iron salt serves not only to convert into ferro-cyanide the cyanides usually removed by the ammoniacal liquor when water alone is used, but also fixes the volatile cyanogen compounds that usually pass onto the purifiers with the gas, thus greatly increasing the yield. I now distill in any form of ammonia-still the ammoniacal liquor containing the ferro-cyanide, and the ferro-cyanide may be recovered from the settled waste liquor from the still by precipitation with an acid iron salt in the well-known way for producing blues; but I prefer to add a second portion of salt of iron or iron oxide to the ammoniacal liquor just before or during the distillation, when by the boiling off of the ammonia in the presence of an excess of the iron salt the soluble ferro-cyanide of ammonia will be converted into an insoluble double salt. The ferro-cyanide of iron and ammonia may be separated afterward by settling or filtration along with the insoluble lime salts when lime is used in the ordinary ammonia-distillation process. Lime is usually used by ammonia distillers to free the fixed ammonia; but this lime being converted into insoluble carbonate, sulphate, &c., has no bearing on this cyanide process, except that it acts as an impurity or waste material in the settlings. These settlings are now treated with an excess of lime or "milk of lime," which decomposes the insoluble ferro-cyanide into soluble lime salt, which may be removed by filtration and washing. I now boil the filtered liquor and add a potash or soda salt as the chloride or sulphate, but preferably the former, sufficient to precipitate all the ferro-cyanide as the double ferro-cyanide of lime and the alkali used; or the liquor may be acidified and boiled, when the double ferro-cyanide of lime and ammonia will be precipitated. In either case the precipitate is separated from the liquor or settling and boiled with a carbonate of the alkali; or the solution of ferro-cyanide of calcium obtained, as above, may be treated with an alkaline carbonate at once, forming an alkaline ferro-cyanide; but this method is not as economical, and I therefore prefer the treatment with the chloride. The resulting solution of alkaline ferro-cyanide is separated from the insoluble lime salts by filtration, and may then be evaporated and crystallized by any of the well-known methods.

Having thus described my invention, I claim as new and desire to secure by Letters Patent—

1. The herein-described process of removing the volatile cyanogen compounds from gas made from soft or bituminous coal, consisting in the addition of an iron salt to the water for extracting the ammonia from the gas passing through the scrubber substantially in the proportion to remove cyanides but insufficient to remove sulphides, thus enabling the cyanogen compounds to be removed as soluble ferro-cyanide of ammonia along with the ammonia compounds usually recovered.

2. The herein-described process of recovering ferro-cyanides from ammoniacal liquor, consisting, first, in adding a portion of iron salt to the liquor, boiling off the ammonia in the usual manner, and treating the settlings with lime to obtain a solution of ferro-cyanide of calcium; second, adding an alkaline chloride or sulphate to this solution to form the double salt, the ferro-cyanide of calcium, and the alkali, and, finally, decomposing this with an alkaline carbonate to form an alkaline ferro-cyanide, which may be crystallized in the usual manner.

WILLIAM L. ROWLAND.

Witnesses:
CHRISTOPHER FALLON,
CHAS. A. RUTTER.